Patented Aug. 14, 1923.

1,464,838

UNITED STATES PATENT OFFICE.

HENRY WILHELM, OF BROOKLYN, NEW YORK.

PRIMARY BATTERY AND PROCESS OF MAKING THE SAME.

No Drawing.  Application filed December 31, 1918. Serial No. 269,152.

*To all whom it may concern:*

Be it known that I, HENRY WILHELM, a citizen of the United States, residing at Brooklyn, in the county of Kings and State of New York, have invented certain new and useful Improvements in Primary Batteries and Processes of Making the Same, of which the following is a specification.

This invention relates to the manufacture of primary or so-called dry batteries, the object thereof being to provide an improved battery and process of making such batteries whereby a longer lived and much better battery is obtained.

Heretofore in the making of primary or dry batteries a bobbin or cartridge is first made and suitably wrapped, having in the center thereof a carbon stick. This cartridge is then set centrally into a zinc cup and an electrolyte poured into the cup so as to surround or cover the cartridge up to the top thereof, and it has been the practice in the making of these batteries to pour this electrolyte in the form of a raw paste or mixture consisting usually of salammoniac, chloride of zinc and water and a suitable starchy matter, such as flour, previously mixed and while in a fluid condition into the zinc cup or cell around this cartridge and then subsequently heat or cook such raw paste so as to congeal or jelly it and enable it to set around the cartridge.

By this mode of procedure however, it was not possible to obtain uniform results by reason of the fact that there was a tendency of the flour to settle to the bottom of the cup, resulting in an excess amount of liquid at the top of the cup prior to the cooking of the paste, and for this reason it was necessary to cook the paste very promptly in order to congeal or jelly it as fast as possible. This cooking however, did not result in a uniform jellying of the raw paste because of the fact that that part of the paste which settled to the bottom would naturally be of greater consistency than the top part thereof, which was of less consistency and if in order to insure a more uniform consistency a greater amount of flour was mixed with the liquid, a paste was obtained of too great a consistency resulting in an electrolyte having too much resistance. As a result of the settling of the flour to the bottom of the cup and this lack of uniformity in the paste the cartridge would soak up or absorb the mixture or moisture in the paste thereby not only interfering with the uniform jellying of the mixture but also helping to deteriorate the mixture of the paste.

Furthermore, when the battery was subjected to heat for the purpose of jellying the paste this heat resulted in a certain amount of decomposition setting up within the cartridge which also materially helped to deteriorate the battery and prevent long life and efficiency thereof, for it is a well known fact that the heating of a battery deteriorates it so much so that as is well known, batteries made by cooking the paste after it is poured into the cup cannot be guaranteed if shipped across the Equator.

Therefore, having found that in the process of making batteries and particularly so when large cell batteries are manufactured, that the starchy matter, such as flour, not only settles before being cooked or congealed so that the subsequent cooking thereof does not produce a uniform electrolyte but that this cooking of the paste with the cartridge also materially helps to deteriorate the battery, the object of the present improvement is to prevent this separation of the liquid and the flour and to eliminate entirely the cooking of the paste after the cartridge is inserted thereinto, and I have discovered that by so making the battery as to prevent this separation and eliminate the cooking of the paste with the cartridge that materially better results and a longer lived battery is obtained, as there is no opportunity for the cartridge to absorb or soak up the moisture in the paste or mixture, or vice versa.

In carrying out this improved method, I first make such a mixture or raw paste that the specific weight of the starchy matter is almost the same as the electrolyte liquid or clear solution, which therefore allows ample time for congealing before any settling of the starchy matter takes place. This paste is made of the usual ingredients, such for instance as salammoniac, chloride of zinc, water and flour, such as potato flour, and is stirred until it is thoroughly mixed and while in a fluid and pourable condition, it is poured into the different zinc cups and permitted to congeal or jelly.

This mixture is put into each of the zinc cups before it sets and while it is in a liquid form. After it reaches a gelatin form, the cartridge is then pushed down thereinto, so that the paste will run up all along the sides of the cup and around the cartridge and any excess amount thereof will be squeezed or forced out of the cup.

Before the cartridge is placed into the paste, the bottom and top thereof are supplied with paraffin washers, the bottom washer being partly for the purpose of centering the cartridge and then the cartridge and washers are pushed down into the paste, and this centralizes the cartridge in the paste and cup while it is being pushed down into the paste. Then the cup with its cartridge therein is reversed and placed into a press and the cartridge and its washers pressed home to the bottom of the cup whereupon the excess quantity of paste in the cup is forced out. After this procedure the usual sealing of the battery is effected.

At no time in the performance of this improved process do I cook or heat the battery or any part thereof, as I have found that this heating or cooking of the cells or batteries materially interferes with the life or efficiency of the finished battery and by pouring the mixture or paste into the cup while in a liquid form and then permitting it to gelatinize before placing the cartridge therein, it is unnecessary to cook the battery in order to jelly the mixture and moreover by not placing the cartridge in the cup until the mixture has become gelatinized there is no opportunity for the cartridge to absorb or soak up moisture in the paste to the deterioration of the cartridge, as all the moisture in the paste is firmly held by the same. Thus, in carrying out the present improvement, the paste in liquid form is poured into the cup before it is set and the cartridge is pushed into the paste after it has reached a jelly form, and thus I am able to do away with the cooking of the paste after it has been placed around the cartridge in order to jelly it. In fact the cartridge may be placed into the paste even after it has become set. In other words, the cartridge may be placed in the gelatinized paste at any time while it is in a jelly form. And the electrolyte when mixed may be used at once before congealing or after it becomes perfectly homogenous.

One of the advantages of this mode of procedure as compared with that heretofore adopted is that when the paste was cooked in order to jelly it after it had been poured around the cartridge the result was that only a portion of the paste would be left in the zinc cup owing to the absorption of the water by the cartridge and the chemical changes of the other ingredients so that the space designed for being filled by the electrolyte was found to be only partly filled while with my improved method the paste is not only more uniform but completely fills the space around the cartridge, any excess thereof having been forced out.

One of the reasons why the absorption by the cartridge of the moisture in the paste proves so detrimental to the battery is due to the fact that the moisture penetrating the cartridge tends to cause a premature activity of the elements of the battery. In other words, this absorption results to a certain extent in the dissolving of the elements of the cartridge whereby the life of the battery is shortened.

I have found by practical experience in the making of these batteries by this improved method that my battery is a much longer-lived battery than anything heretofore known on the market and also gives a whiter light. In fact, I have found by actual tests that its life is almost twice as long as the ordinary battery as made today. In other words, the average one and one-quarter inch tubular dry battery as made today will give a serviceable light continuously for about eight hours whereas my battery of the same size will give a light for fourteen hours continuously and frequently more, and a better light at that.

Another of the advantages of my improved method resides in the fact that I have greater lee-way in the mixing of the eltctrolyte paste or mixture for the reason that under the old method of cooking the paste the battery maker was necessarily limited to certain proportions of the ingredients in the paste, that is to say, he had to mix his paste within certain limits governed by the cooking thereof, which caused considerable swelling of the paste or gave a watery result. That is to say, by the old method, by which it is necessary to cook the paste only a certain amount of flour or similar material can be used for the reason that as hereinbefore stated, there is a certain amount of settling and absorption and because the cooking step causes a considerable amount of swelling; whereas by my method of gelatinizing the mixture beforehand and without any cooking of the battery I am able to make an electrolyte of any desired consistency or electrical resistance because there is no change in the paste after it is poured into the cup other than the jellying thereof.

I claim as my invention:

1. The method of making a primary or dry battery, which consists in supplying a cup with a cartridge and an uncooked paste of electrolyte materials and without any cooking thereof permitting it to jelly, the cartridge being inserted into said paste and then sealing the battery.

2. The method of making a primary or dry battery, which consists in first supplying a cup with an uncooked paste of electrolyte materials and without any cooking thereof permitting it to jelly, then pushing a cartridge into the jellied paste, and then sealing the battery.

3. The method of making batteries, which consists in pouring into a cup an uncooked mixture or paste while in a pourable condition and permitting it to gelatinize without the cooking thereof and inserting a cartridge into the jelly formed paste whereby the soaking up of the moisture from the paste by the cartridge is prevented, and then sealing the battery.

4. The method of making a primary or dry battery, which consists in making a paste of chloride of zinc, salammoniac, water and a starchy material, stirring it until it is mixed and then while in a pourable condition pouring it into a cup and permitting it to jelly without any cooking thereof, then inserting a cartridge into the jelly formed mixture, and then sealing the battery.

5. The method of making a primary or dry battery, which consists in making a paste of chloride of zinc, salammoniac, water and potato flour, stirring it until it is mixed and then while in a pourable condition pouring it into a cup and permitting it to jelly without any cooking thereof, then inserting a cartridge into the jelly formed mixture, and then sealing the battery.

6. The method of making a primary or dry battery, which consists in first making a paste and while in a fluid or pourable condition and before it has become set pouring it into a zinc cup and permitting it to jelly without the cooking thereof, then inserting a cartridge into the jelly formed paste, and then sealing the battery.

7. The method of making an uncooked primary or dry battery, which consists in making a fluid paste and then while in liquid form before it becomes set pouring it into a zinc cup and permitting it to jelly without the cooking thereof, then after it has jellied inserting a cartridge therein, then pushing home the cartridge and squeezing out any excess paste, and then sealing the battery.

8. The method of making an uncooked primary or dry battery which consists in making an uncooked paste of electrolyte materials, then while in pourable condition pouring such paste into a cup and permitting it to jelly without the cooking thereof, then inserting a cartridge therein previously supplied with washers or disks at the bottom and top thereof, then reversing the cup and pushing home the cartridge to squeeze out any excess paste, and then completing the battery by sealing it.

9. The method of making an uncooked primary or dry battery, which consists in making an uncooked paste of electrolyte materials and stirring it until it has reached a uniform consistency and then pouring it into a cup and permitting it to congeal or jelly without the cooking thereof, then inserting a cartridge into the jelly formed paste and pushing it home to squeeze out any excess thereof, and then completing the battery by sealing it.

10. The method of making a primary or dry battery, which consists in making a cold paste of electrolyte materials, and stirring it until it has reached a uniform consistency and then pouring it while in a pourable condition into a cup and permitting it while still cold to congeal or jelly, then inserting a cartridge into the jelly formed paste and pushing it home to squeeze out any excess thereof, and then completing the battery by sealing it.

11. A primary or dry battery, consisting of a cup, an uncooked paste in the cup, and a cartridge inserted into the paste.

12. A primary or dry battery, consisting of a cup, an uncooked jellied paste of electrolyte materials therein, and a cartridge inserted into the paste.

13. A primary or dry battery, consisting of a zinc cup, an uncooked jellied paste of electrolyte materials having uniform consistency in said cup, and a cartridge inserted into said paste.

14. A primary or dry battery, consisting of a cup, an uncooked cold jellied paste of electrolyte materials having uniform consistency in said cup, and a cartridge inserted into said paste.

15. A primary or dry battery, consisting of a cup, an uncooked cold jellied paste therein consisting of chloride of zinc, salammoniac, water and a starchy material thoroughly mixed, and a cartridge inserted into said paste.

16. A primary or dry battery, consisting of a cup, an uncooked cold jellied paste therein consisting of chloride of zinc, salammoniac, water and potato flour thoroughly mixed, and a cartridge inserted into said paste.

17. A primary or dry battery, consisting of a zinc cup, an uncooked jellied paste therein of electrolyte materials having uniform consistency, and a cartridge inserted and pushed home into said paste after it is jellied.

18. The method of making a battery which consists in supplying a cup with a gelatinized electrolyte, and inserting a cartridge into said gelatinized electrolyte.

19. The method of making a battery which consists in supplying a cup with a mixture of electrolyte materials, permitting said mixture to gelatinize, and then inserting a cartridge into the gelatinized mixture.

Signed at No. 1822 Park Row Building, New York city, county and State of New York, this 30th day of December, 1918.

HENRY WILHELM.